United States Patent
Kempka et al.

(10) Patent No.: US 7,124,747 B2
(45) Date of Patent: Oct. 24, 2006

(54) ARRANGEMENT FOR SUPPLYING AN INTERNAL COMBUSTION ENGINE WITH FUEL

(75) Inventors: Karl-Heinz Kempka, Rutesheim (DE); Stefan Klein, Magstadt (DE); Dieter Scheurenbrand, Wolfschlugen (DE); Roland Schirmer, Altdorf (DE); Manfred Weil, Schorndorf (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 10/857,361

(22) Filed: May 28, 2004

(65) Prior Publication Data

US 2004/0244780 A1   Dec. 9, 2004

(30) Foreign Application Priority Data

May 31, 2003   (DE)   ................. 103 24 779

(51) Int. Cl.
 *F02M 37/04*   (2006.01)
(52) U.S. Cl. ................. 123/509; 123/514; 137/565.34
(58) Field of Classification Search ................ 123/509, 123/514, 198 D, 510, 495, 456; 137/565.34, 137/565.17, 571, 572, 565.01
See application file for complete search history.

(56) References Cited

U.S. PATENT DOCUMENTS

| | | | | |
|---|---|---|---|---|
| 5,394,902 A | * | 3/1995 | Shibao | .................. 137/565.17 |
| 6,000,913 A | * | 12/1999 | Chung et al. | .................. 417/53 |
| 6,260,543 B1 | * | 7/2001 | Chih | .......................... 123/509 |
| 6,553,973 B1 | * | 4/2003 | Coha et al. | .................. 123/509 |
| 6,619,272 B1 | * | 9/2003 | Jones et al. | .................. 123/514 |
| 6,739,319 B1 | * | 5/2004 | Braun et al. | ................. 123/509 |
| 6,776,185 B1 | * | 8/2004 | Farrar et al. | ................. 137/560 |
| 2003/0000502 A1 | * | 1/2003 | Jones et al. | .................. 123/509 |
| 2004/0237941 A1 | * | 12/2004 | Sinz | .......................... 123/509 |

FOREIGN PATENT DOCUMENTS

| | | |
|---|---|---|
| DE | 195 28 182 | 2/1997 |
| DE | 197 33 949 | 1/1999 |
| JP | 08 282307 | 10/1996 |

* cited by examiner

*Primary Examiner*—Carl S. Miller
(74) *Attorney, Agent, or Firm*—Klaus J. Bach

(57) ABSTRACT

In an arrangement for supplying an internal combustion engine with fuel and a method for servicing and repairing the arrangement wherein a number of components, that is, a fuel reservoir, a fuel pumping unit, a fuel filter, a fuel level sensor and line elements are arranged in a fuel container and the container has an access opening formed in a wall thereof and sealingly closed by a cover, at least the fuel reservoir and at least one of the line elements are firmly installed in the fuel container and for servicing or replacement only the other components are removed through the access opening after being disconnected from their support mounts and associated connecting lines.

5 Claims, 6 Drawing Sheets

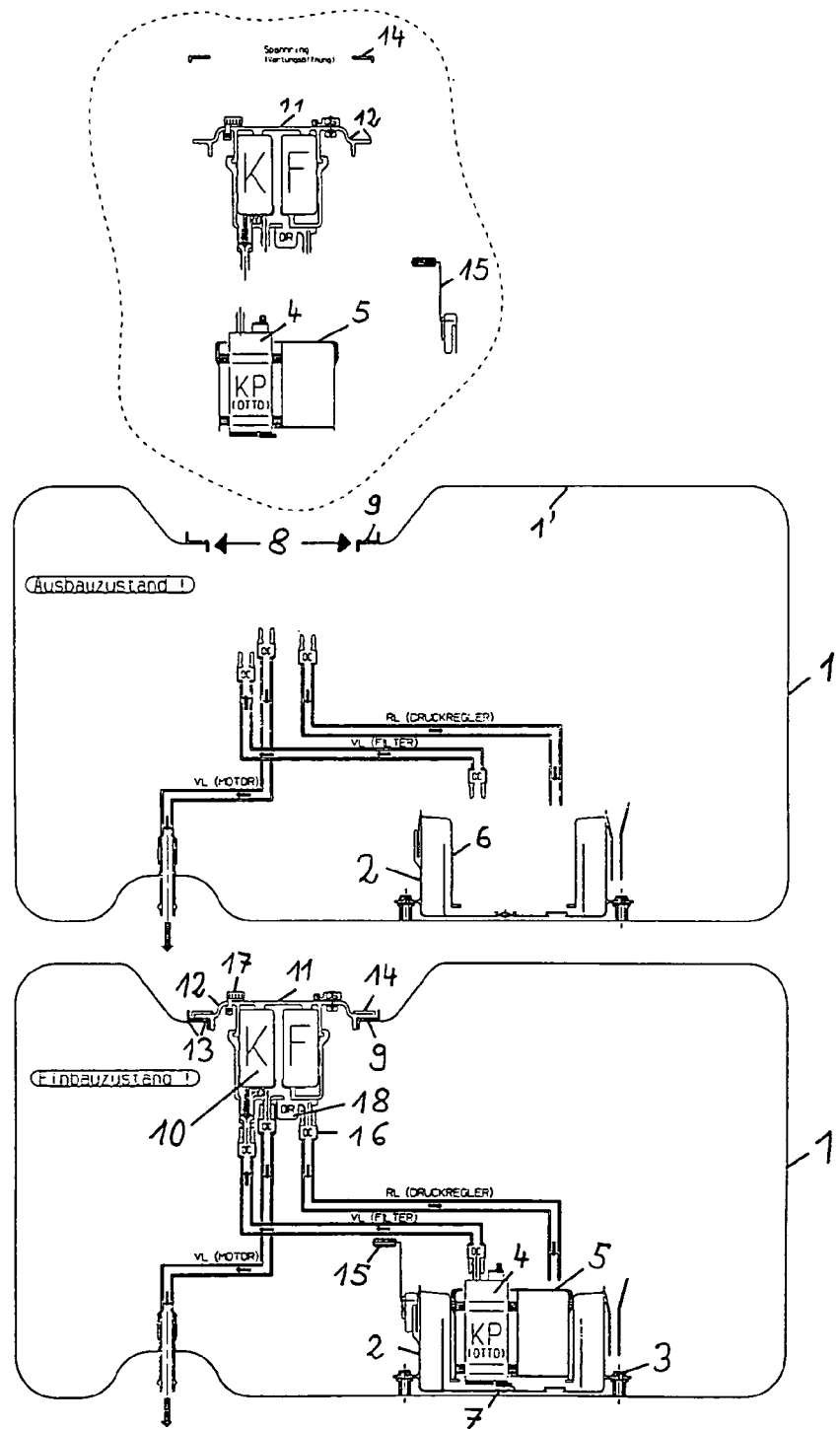

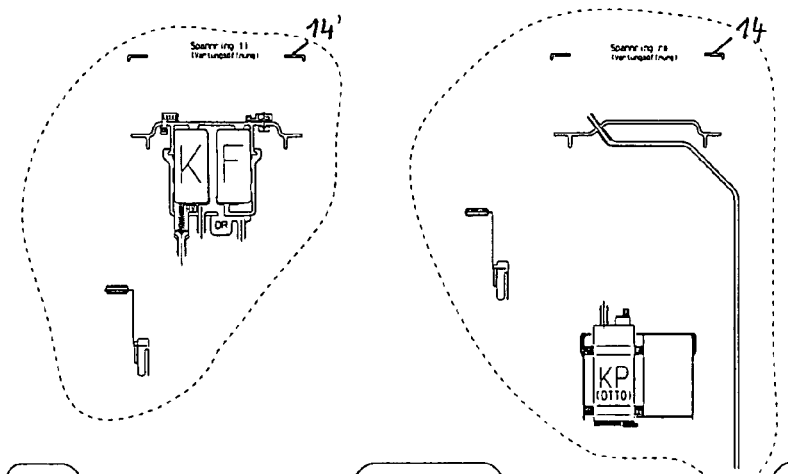
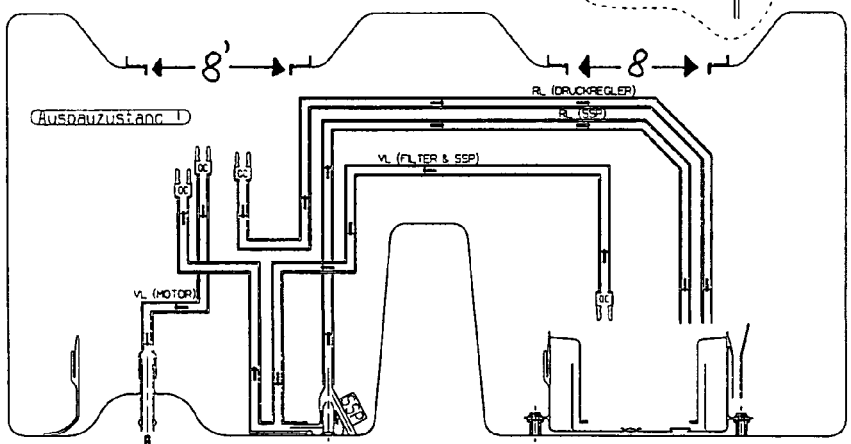
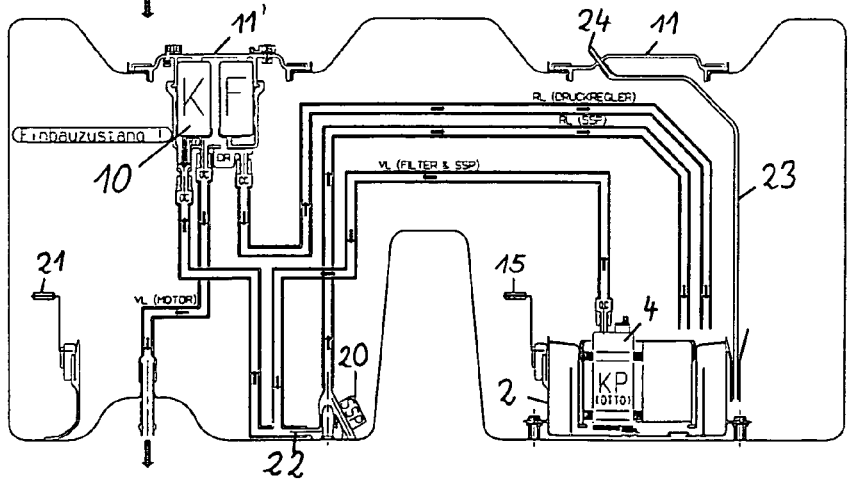

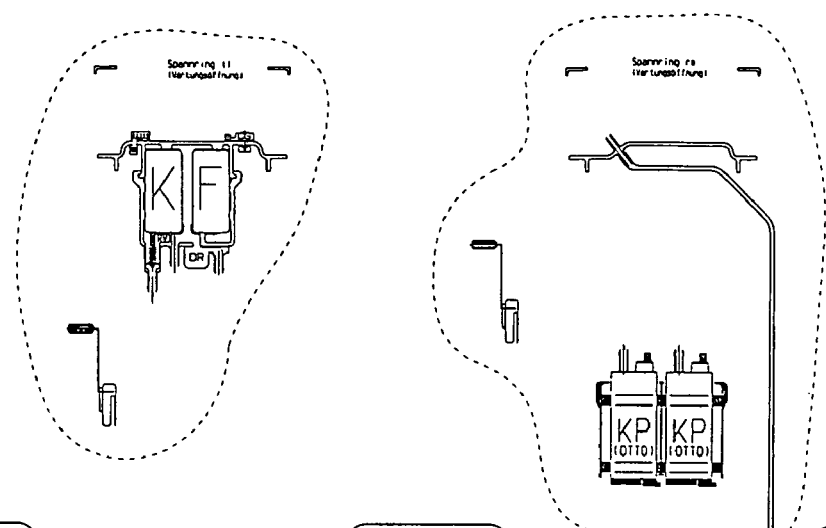
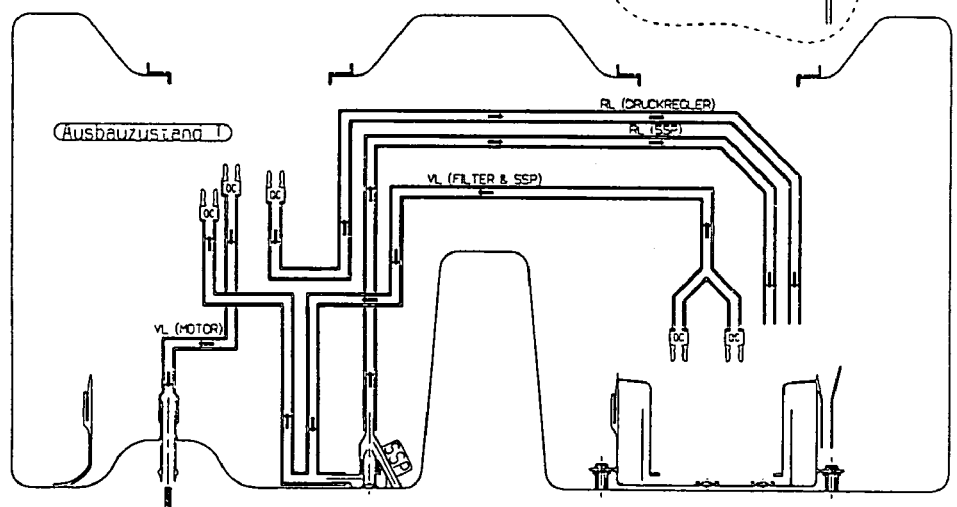
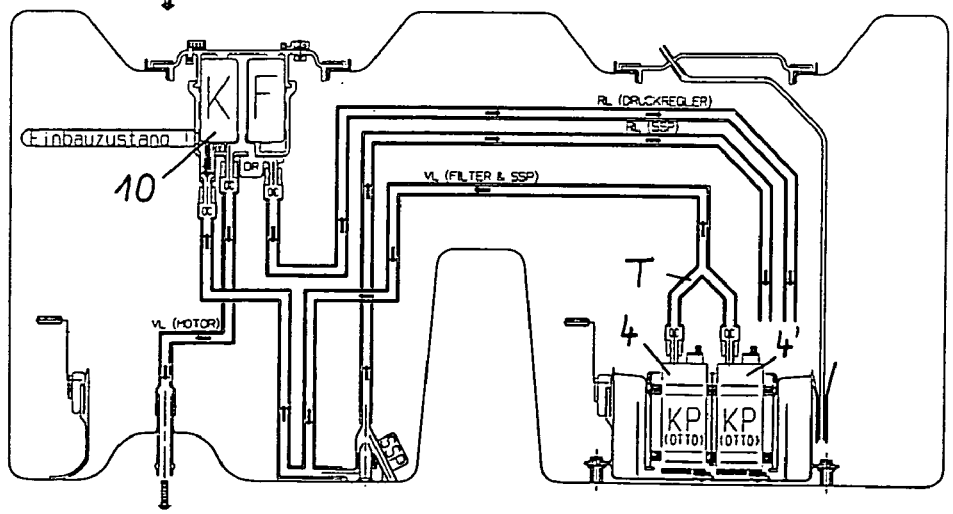
Fig. 5c
Fig. 5b
Fig. 5a

ARRANGEMENT FOR SUPPLYING AN INTERNAL COMBUSTION ENGINE WITH FUEL

BACKGROUND OF THE INVENTION

The invention relates to an arrangement for supplying an internal combustion engine with fuel, comprising a fuel container including a fuel reservoir, a fuel pump, a fuel filter and a fuel level sensor and pipe elements which are accessible by a closable opening in the fuel container.

DE 195 28 182 A1 discloses a fuel pumping unit for pumping fuel from a fuel tank to an internal combustion engine of a motor vehicle. The fuel pumping unit can be arranged in the fuel tank as an assembly unit. A tank flange is connected, by way of a rotatable and longitudinally movable mechanical connection to a surge pot which includes a fuel pump and a fuel level sensor. The mechanical connection includes two spring elements which are mounted on the tank flange and the surge pot in a non-pivotable or -rotatable manner. Intermediate sections of the spring elements facilitate longitudinal movement and rotation of the surge pot relative to the tank flange and its support on the bottom of the fuel tank in a uniform manner.

Normally, the surge pot which is arranged within the fuel tank is part of a fuel pumping unit which also includes an electric fuel pump, by which fuel is supplied to the internal combustion engine. The purpose of the surge pot whose volume is substantially smaller than that of the fuel tank is mainly to ensure that a sufficient amount of fuel is contained in the area of the fuel pump inlet even under adverse operating conditions for example when the tank is close to empty or when negotiating a long curve or when the vehicle is not in a horizontal position. This requires the presence of a certain minimum amount of fuel in the surge pot so that the surge pot must have a certain minimum volume which is reduced by the fuel pumping unit and other components usually disposed in the surge pot. Today's motor vehicles however require a surge pot with a particularly large volume since short-term interruption of the fuel supply may for example cause damage to an exhaust gas catalytic converter.

For reason of stability of the fuel container and in order to achieve low emissions and to provide for a simple sealing of the container opening by a closing element, one usually tries to keep the cross-section of the opening in the fuel container as small as possible. For units which comprise a surge pot, a fuel supply pump and a fuel filter the size and consequently the volume of the surge pot is therefore limited. Extreme operating conditions of the vehicle, that is extreme sideward leaning or high centrifugal forces when negotiating a curve, can therefore result in a possibly large fuel loss per time unit from the surge pot. In order to ensure that also under these conditions a sufficiently large amount of fuel remains at the inlet for the fuel pump unit, the surge pot, whose height is limited by the height of the fuel tank, should have a relatively large volume. This however can be achieved only by a corresponding enlargement of the cross-section of the surge pot.

It is consequently the object of the present invention to provide an arrangement for supplying an internal combustion engine of a motor vehicle with fuel and also to provide a method of servicing or repairing such an arrangement in a simple and inexpensive way, wherein in spite of a small opening in the wall of the fuel container, a relatively large surge pot or fuel reservoir is provided.

SUMMARY OF THE INVENTION

In an arrangement for supplying an internal combustion engine with fuel and a method for servicing and repairing the arrangement wherein a number of components, that is, a fuel reservoir, a fuel pumping unit, a fuel filter, a fuel level sensor and line elements are arranged in a fuel container and the container has an access opening formed in a wall thereof and sealingly closed by a cover, at least the fuel reservoir and at least one of the line elements are firmly installed in the fuel container and only the other components are removed through the access opening after being disconnected from their support mounts and associated connecting lines.

In accordance with a particularly embodiment of the invention, the fuel reservoir is supported on the bottom of the fuel tank by way of noise insulation or uncoupling elements. The noise uncoupling elements 3 are welded to the bottom wall of the fuel container 1. The uncoupling elements 3 are not removable once attached to the fuel reservoir 2; that is they cannot be removed without being destroyed.

In accordance with another embodiment, the fuel filter element, the fuel pumping unit and/or the fuel level sensor are combined into a unit which is supported in the fuel container so as to be removable for servicing or repairing.

Preferably, releasable connections are provided comprising quick-connectors and/or a spring-biased locking connection.

Furthermore, in a preferred embodiment, line elements are provided which are designed for conducting the electric current or the liquid ($RL_{Druckregler}$, $RL_{ssp}$, $VL_{Filter}$, $VL_{Motor}$ and $VL_{Filter+ssp}$) and/or gaseous media. The line elements are interconnected for a stable support structure in the fuel container and, for servicing procedures, remain in the fuel container. The return line $RL_{Druckregler}$ is furthermore firmly welded to the reservoir at its side adjacent the reservoir. The supply line $VL_{Motor}$ exits the container at an inwardly curved recess at the bottom of the fuel container and extends toward the internal combustion engine. The supply line $VL_{Motor}$ at this point is firmly soldered to the bottom of the container. The return line $RL_{ssp}$ is also firmly supported in the container and is connected to a suction jet pump.

The arrangement for supplying an internal combustion engine with fuel can advantageously be used in connection with single or double chamber fuel containers for gasoline- or Diesel engine-operated vehicles.

It is advantageous if, with the method according to the invention for servicing or repairing an arrangement for supplying an internal combustion engine with fuel, which comprises a fuel container including within it a fuel reservoir, a fuel pumping unit, a fuel filter, a fuel level sensor and line elements, the fuel reservoir and the line elements remain permanently in the fuel container. The components arranged in the fuel container are accessible by an opening in the wall of the fuel container which can be closed. The servicing and repairs can be performed through that opening. For service and repair procedures of this arrangement, in a first step, a locking ring is removed so that a cover of the opening can be removed. In a subsequent second step, the hydraulic lines connected by quick-connectors and/or the electric lines interconnected by snap-in connectors are disconnected. In a third step, then the fuel pumping unit, the fuel filter and the fuel level sensor are removed while the fuel reservoir and the line elements remain permanently in the fuel container.

The invention will become more readily apparent from the following description of preferred embodiments thereof described below on the basis of the accompanying drawings.

BRIEF DESCRIPTION OF THE DRAWINGS

FIGS. 1a to 1c show schematically, and in a simplified manner, a fuel supply arrangement in a single chamber fuel container for a gasoline engine including a fuel pumping unit, FIGS. 4a to 4c show a fuel supply arrangement of a two chamber fuel container of a gasoline engine with a fuel pumping unit, FIGS. 5a to 5c show a fuel supply arrangement of a two-chamber fuel container for a gasoline engine with two fuel pumping units.

DESCRIPTION OF THE VARIOUS EMBODIMENTS

Figure 2C:
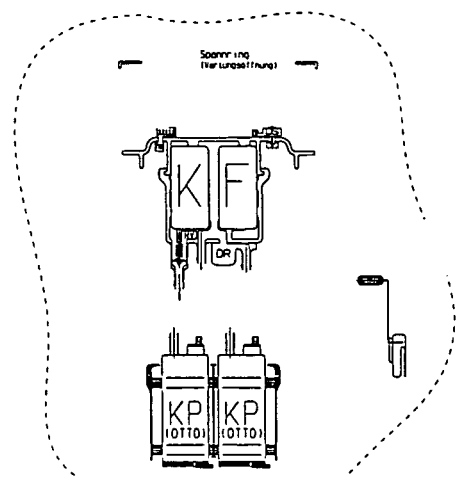
FIGS. 2a to 2c show a fuel supply arrangement for a gasoline engine with two fuel pumping units.

FIGS. 1 to 6 include each the partial figures a to c, wherein the partial figures a to c show under
a) a fuel container with all devices installed therein,
b) the fuel container with the various units removed, and
c) the various units which can be removed for servicing removed from the fuel container.

FIG. 1a shows a single chamber fuel container for a gasoline engine with all units installed in the fuel container. A fuel supply arrangement comprises the fuel container 1 in which a fuel reservoir 2 is arranged, which is supported on the bottom of the fuel container 1 by way of noise absorbing support elements 3. The noise absorbing support elements 3 consist of an elastomer material, which absorbs the vibration generated in the reservoir 2 by the operation of a fuel pump which may produce noises. The walls 6 provided in the fuel reservoir 2 form a circular opening in which the fuel pump 4 contained in a plastic holder or plastic housing 5 is accommodated. During operation of the fuel pump, fuel is sucked into the pump from the reservoir 2 and is supplied to the internal combustion engine. The fuel reservoir 2 and the plastic holder or the plastic housing consist for example of a fuel resistant plastic material.

The fuel reservoir 2 includes a cover (not shown) with an opening for inserting the fuel pumping unit 4, wherein the pumping unit 4 is guided by spring-operated locking elements disposed on the cover (not shown) into a position in which the fuel pump is centered and engaged. The cover of the reservoir 2 further includes two connecting points for the fuel return lines.

The fuel reservoir 2 additionally is provided at the side thereof with several possible coupling locations or lock-in positions for one or several fuel level sensors 15, which provide automatically for electrical contacts when snapped into position. These fuel level sensors 15 are so-called fill-level sensors which indicate the fuel level in the respective container chambers.

The reservoirs 2 are filled with fuel from the fuel container 1 by a suction jet pump which is not shown but which is arranged at the bottom of the reservoir 2, by way of a so-called mushroom valve 7 (check valve). A seal and uncoupling element (not shown) of the suction jet pump is arranged directly above the mushroom valve 7 in the bottom part of the fuel reservoir 2. The suction jet pump 7 pumps in this way fuel from the fuel container 1 into the fuel reservoir 2.

As shown in FIG. 1b, the fuel container 1 includes in its top wall 1 an opening 8 which is preferably circular and which is covered by a closure element 11 with an annular seal 9, for example a profile or O-ring seal, which consists of a liquid-, gas-tight and fuel resistant material, disposed between the container wall and the closure element 11. Integrated into the closure element 11 of the fuel container 1 is a fuel filter element 10, which filters the fuel supplied by the fuel pumping unit 4 before it is supplied to the internal combustion engine. The closure element 11 includes an outer annular area 12 (see FIG. 1c) which covers an also annular edge area 13 of the opening 8 of the fuel container 1 when installed onto the fuel container 1. The overlapping annular area 12 and the edge area 13 are interconnected by an annular flange or clamping ring 14 by mounting means such as screws, threaded bolts and nuts (not shown). The top of the fuel container 1 is stabilized by reinforcement rings of metal (not shown). Because of the force introduction of the connection by way of the clamping ring 14, the openings in the edge area 12 of the closure element 11 are reinforced by integrated support sleeves (not shown). With this measure, a well-defined sealing force can be obtained.

The closure element 11 includes a connection structure 17 for electrical connecting lines by way of which all electrical lines (not shown) for the connection of the fuel pump 4, the fuel level sensor 15 and an optional heater 23 shown in FIG. 4a can be connected to an electric power supply outside the fuel container in a liquid-tight manner. As shown in FIG. 1a at the lower end of the fuel filter element 10, a pressure controller 18 is arranged from which a return line $RL_{DR}$ extends. The fuel supply pump unit 4 supplies continuously a certain fuel volume, which is larger than the maximum amount needed by the engine under full power operation. In the pressure controller 18, the excess fuel amount is diverted and returned to the fuel reservoir 2 by way of the return line $RL_{DR}$.

The hydraulic lines ($RL_{Druckregler}$, $VL_{Filter}$, $VL_{Motor}$) which are required for conducting liquid and/or gaseous media and are shown in FIGS. 1a and 1b always remain within the fuel container like the electrical lines which are not shown so that they do not have to be removed or exchanged for servicing. $VL_{Filter}$ designates the fuel supply line which extends form the fuel pumping unit 4 to the fuel filter unit 10, $VL_{Motor}$ designates the fuel supply line which extends from the fuel filter unit 4 to the engine and $RL_{Druckreglar}$ designates the return line which extends from the pressure controller back to the fuel reservoir 2. The hydraulic lines are connected to the respective components by so-called quick-connectors which provide snap-in connections to a tubular connector piece as shown in FIGS. 1a to 6a.

The fuel contained in the fuel reservoir 2 is supplied to the fuel filter unit 10 from the fuel pumping unit 4 by way of the fuel supply line $VL_{Filter}$. Depending on the load requirements of the engine, fuel is supplied to the engine by way of the supply line $VL_{Motor}$. If the filtered fuel is not needed by the engine it is returned to the fuel reservoir 2 by way of the return line $RL_{Druckreglar}$.

Figure 2B:
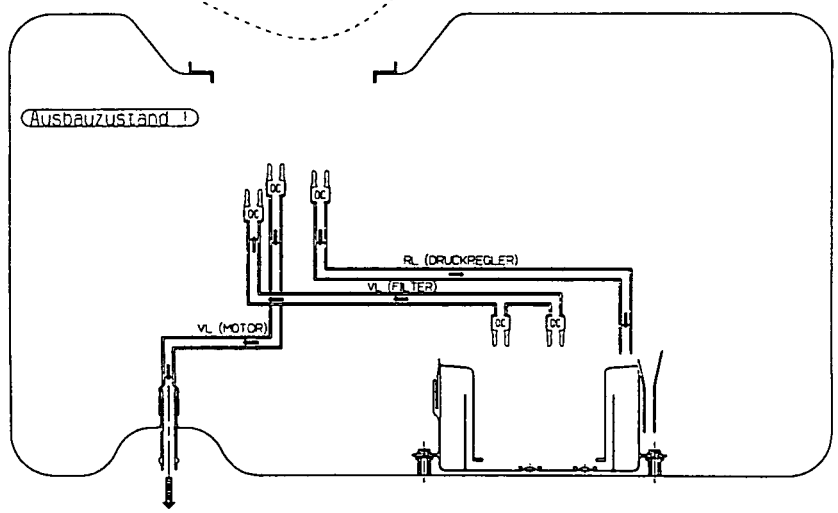
Figure 2A:
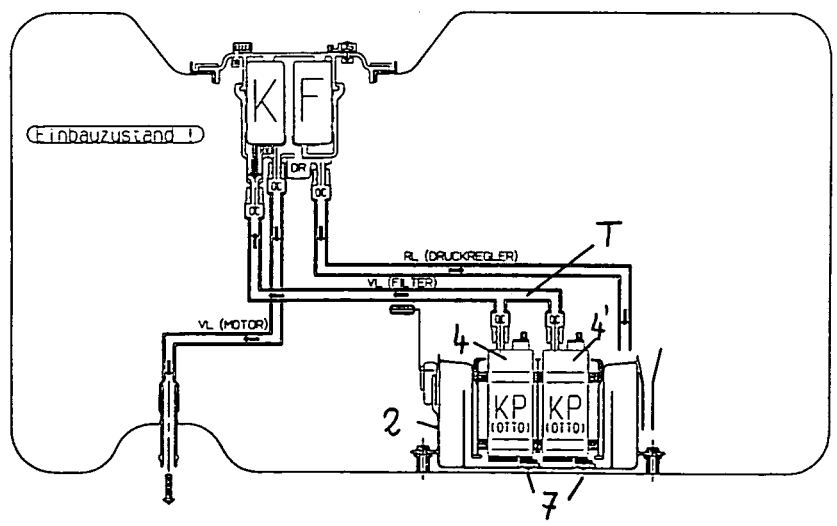

FIG. 2 shows a variant of the arrangement for supplying an internal combustion engine with fuel for a gasoline engine wherein, for clarity reasons, for identical or functionally identical components shown in FIG. 1, the same reference numerals are used and, for their description, reference is made to the description of FIG. 1. The arrangement of FIG. 2 differs from that of FIG. 1, in that, on one hand, two fuel pumping units 4, 4' are arranged in the fuel reservoir 2 and, on the other hand, two mushroom valves 7 are arranged at the bottom of the reservoir 2 by way of which two jet suction pumps can fill the reservoir 2 with fuel. The two fuel pumping units 4, 4' are connected jointly to the filter unit 10 by way of a T-piece.

Figure 3C:
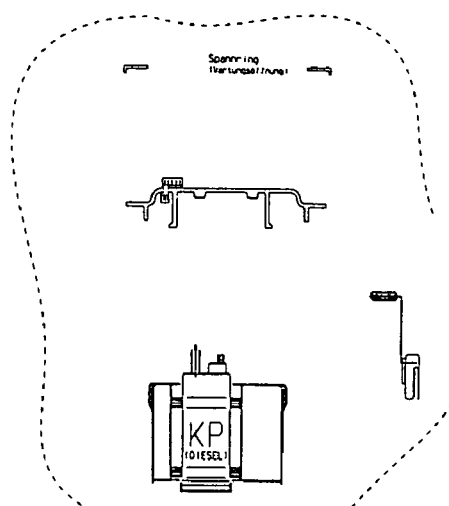
FIGS. 3a to 3c show a fuel supply arrangement for a single chamber fuel container for a Diesel engine with a fuel pumping unit.
Figure 3B:
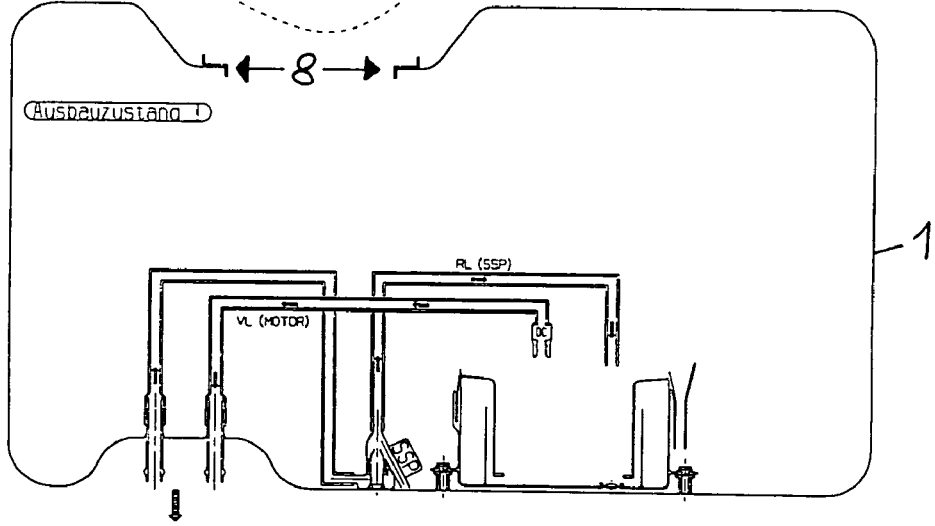
Figure 3A:
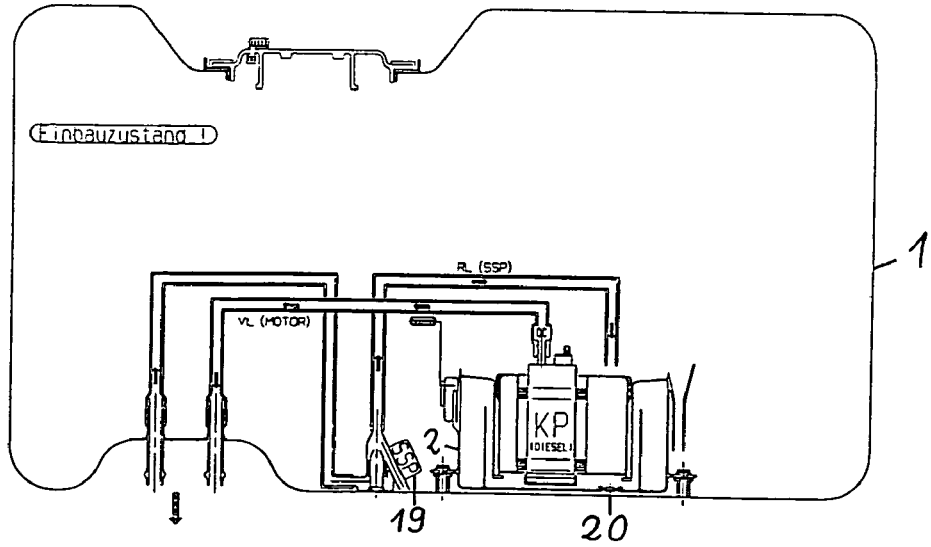
Figure 6C:
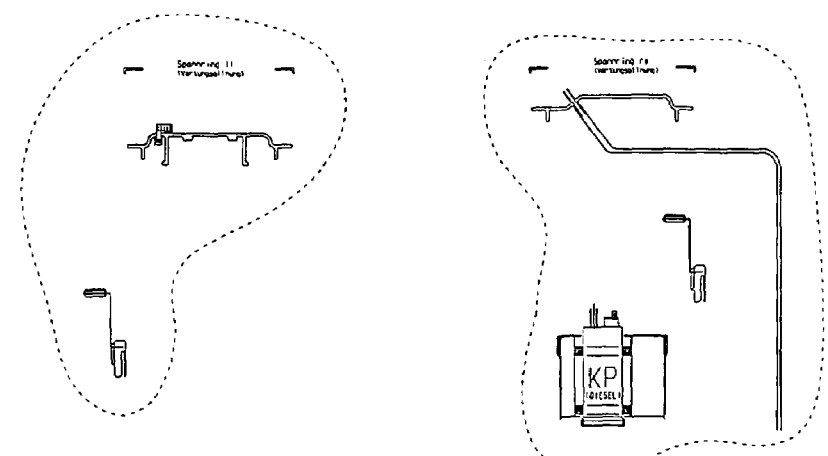
FIGS. 6a to 6c show a fuel supply arrangement of a two-chamber fuel container for a Diesel engine with a single fuel pumping unit.
Figure 6B:
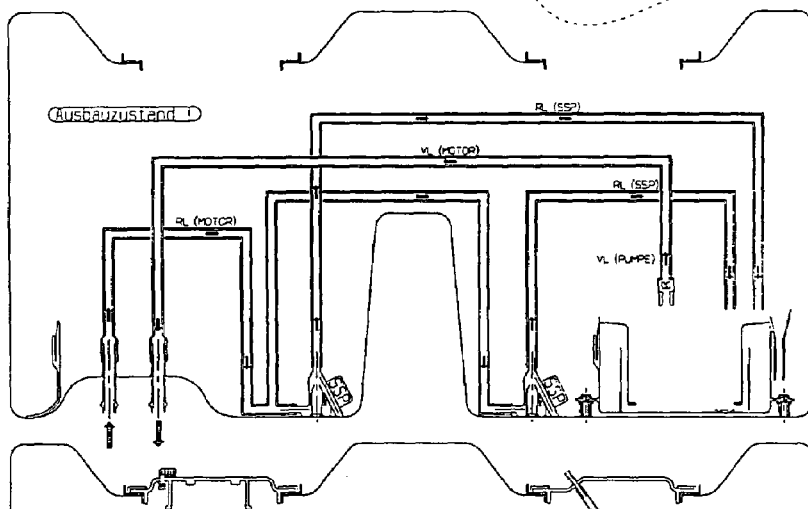
Figure 6A:
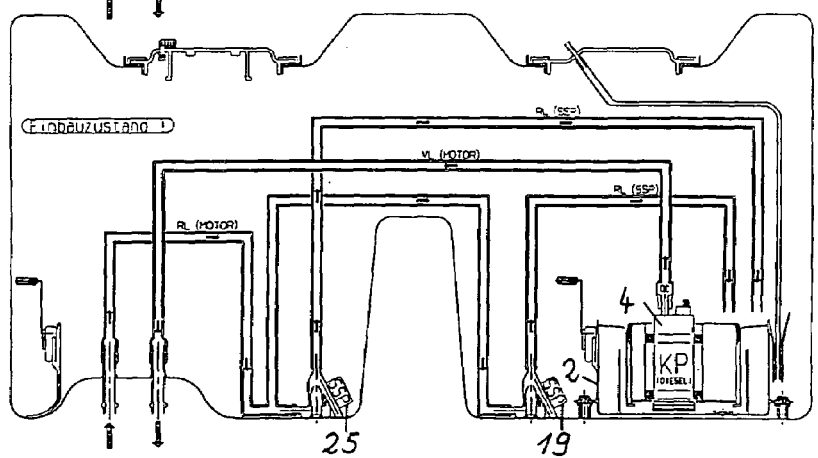

FIG. 3 shows a single chamber fuel container with a fuel pumping and installation arrangement for a Diesel engine. Here, like in the following FIGS. 4–6, for simplicity reasons, for identical or functionally identical components the same reference numerals are used as in the various earlier figures and for the description of these components reference is made to the earlier figures and the respective description. Different from the containers described earlier, the container 1 of FIG. 3 does not include a fuel filter unit 10 arranged at the opening 8 of the fuel container 1. The filter unit for the Diesel variant is arranged near the engine. Also, in contrast to the preceding figures, the jet suction pump is not arranged at the fuel pumping unit 4, but the arrangement includes an external jet suction pump 19, which is disposed at one side of the reservoir 2 and which is operated by the fuel return flow and provided with a return line $RL_{ssp}$ for returning the fuel to the reservoir 2. The jet suction pump 19 is operated by the fuel flow returning from the engine. At the bottom of the fuel reservoir 2, there is a mushroom valve 20 which is used for filling of the reservoir only when the reservoir 2 is empty or fuel has to be added by a spare canister.

The arrangement according to FIGS. 4a and 4b for gasoline engines differs from that according to FIG. 1 and FIG. 2 only by the following features: The fuel container 1 includes a two chamber system which is also called a saddle tank with a fuel pumping unit 4 in the right-side fuel chamber. In a two chamber system, an additional external fuel flow-operated jet suction pump 20 and an additional fuel level sensor 21 are arranged in the left fuel container chamber. The support for the left fuel level sensor 21 remains firmly connected to the bottom of the container 1, but the fuel level sensor 21 is exchangeable. The right fuel container chamber is filled by means of the jet suction pump 20 by way of the return line $RL_{ssp}$. The jet suction pump 20 remains together with the line elements in the fuel container 1. The fuel supplied by the pumping unit 4 is pumped by way of a supply line $VL_{Filter+ssp}$ to the fuel filter unit 10, which is mounted to the additional cover 11' of the left servicing opening. A small part of the fuel is diverted, by way of the line section 22, for the operation of the external jet suction pump. In the right container chamber furthermore an optional fuel discharge line 23 is provided and the right cover 11 includes a connection 24 for a heater.

In the following embodiments according to FIG. 5 or FIG. 6, identical or functionally identical components are again designated by the same reference numerals as in the other drawings.

The arrangement according to FIG. 5 differs from the arrangement according to FIG. 4 essentially only in that an additional pumping unit 4' is used wherein the connection between the fuel pumping units 4, 4' and the supply line to the fuel filter unit 10 is established by way of a T-piece as already shown in FIG. 2.

FIG. 6 shows a two-chamber system for Diesel engines. As shown already in FIG. 3, only one fuel pumping unit 4 is provided including a supply line $VL_{Motor}$ which can be connected by a quick connector and by way of which the fuel can be supplied to the engine. With the two chamber system of Diesel engine operated motor vehicles, in each of the left and the right container chambers an additional return flow operated jet suction pump 19, 25 is provided. The jet suction pump 25 in the left chamber pumps the fuel by way of a return line $RL_{ssp}$ to the container side, in which the fuel supply unit 4 is arranged, the jet suction pump 19 pumps the fuel by way of the return line $RL_{ssp}$ into the fuel reservoir 2. Both jet suction pumps 19, 25 are driven by the fuel returning from the engine in the return line $RL_{ssp}$.

As schematically shown in FIGS. 1b to 6b (disassembled state of the fuel container with the components remaining in the container) and in FIGS. 1c to 6c (components removable from the container), the disassembly of the removable components will now be described on the basis of FIG. 4 in a way representative for all embodiments. At the servicing opening 8 shown at the right in FIG. 4c, the clamp-down ring 14 is removed by releasing the mounting means and the cover 11 which is optionally provided with a heater connection 24 and the fuel discharge line 23 connected thereto, is opened and also removed. With the servicing arrangement according to the invention, the disassembly is accomplished through the relatively small servicing opening with only one hand. To this end, first the locking mechanism for the fuel pumping unit 4 at the fuel reservoir is opened to release the fuel pumping unit 4 and then the hydraulic supply line $VL_{Filter+ssp}$ of the pumping unit 4 is disconnected at the quick connector. After the electrical lines are disconnected (not shown) at the pumping unit 4 and the fuel level sensor 15, both components can be removed for servicing or repair or for exchange. After opening of the left service opening 8' and disconnecting the quick connectors, by which the hydraulic lines $VL_{Motor}$, $VL_{Filter+ssp}$, and $RL_{Druckreglar}$) at the fuel filter unit 10 are mounted, the filter unit 10 can be removed. By disconnecting the electric lines, also the fuel level sensor of the left container chamber can be exchanged. As apparent from FIG. 4, all the hydraulic lines ($VL_{Motor}$, $VL_{Filter+ssp}$ and $RL_{Druckreglar}$) and the electric line elements (not shown) and also the fuel reservoir 2 remain in the fuel container 1.

As already pointed out in connection with the various embodiments, the arrangement provides in an advantageous manner for a modular building system with high variability and flexibility of the complete system. The servicing concept provides for a simple and uncomplicated removal of the various components that may require servicing. It is advantageous that the lines remain in the container since, with complex fuel container geometries, the removal could be complicated or the lines could be damaged in the process. Since the fuel reservoir remains in the fuel container, it may have a relatively large volume without having a complex shape and without the need for particular design features that would permit its removal. The service opening may be small and can easily be kept sealed. Also, the individual modular components (fuel reservoir 2, fuel filter unit 10, fuel pumping unit 4) can be firmly supported in the fuel container so as to be isolated from each other and from the container for noise control.

What is claimed is:

1. An arrangement for supplying an internal combustion engine with fuel, with components including a fuel container (1) and a fuel reservoir (2), a fuel pumping unit (4), a fuel filter (10), a fuel level sensor (15), and line elements arranged within said fuel container (1) and connected to said components by quick connectors and said fuel container furthermore including an opening through which said components are accessible for servicing or repairing the components and a cover (11) for sealingly closing said openings, said cover being removable so as to provide access to the quick connectors for disconnecting said line element quick connectors and any electrical lines joined by plug-in connections thereby to permit removal of said fuel pumping unit (4), said fuel filter (10) and said fuel level sensor (15) from said fuel container (1), said fuel reservoir (2) and at least one of said line elements being firmly and permanently mounted to the bottom of said fuel container (1) by way of noise uncoupling elements (3).

2. An arrangement according to claim 1, wherein said fuel filter element (10), said fuel pumping unit (4) and said fuel level sensor (15) are releasably mounted in said fuel container so that they can easily be removed for servicing or repairs.

3. An arrangement according to claim 2, wherein said removable components are releasably connected by said quick-connectors (16) and/or lock-in connecting members.

4. An arrangement according to claim 1, wherein said line elements are designed for conducting electric current or liquid and, respectively, gaseous media.

5. An arrangement according to claim 1, wherein said fuel container includes two chambers with a fuel reservoir including a fuel pumping unit arranged in one of said chambers and a jet suction pump arranged at least in the other chamber and a fuel line extending from said jet suction pump to said fuel reservoir in said one chamber.

* * * * *